(12) United States Patent
Wakefield

(10) Patent No.: US 7,162,696 B2
(45) Date of Patent: Jan. 9, 2007

(54) METHOD AND SYSTEM FOR CREATING, USING AND MODIFYING MULTIFUNCTIONAL WEBSITE HOT SPOTS

(76) Inventor: Franz Wakefield, 17731 NW. 14th Ct., Miami, FL (US) 33169

( * ) Notice: Subject to any disclaimer, the term of this patent is extended or adjusted under 35 U.S.C. 154(b) by 409 days.

(21) Appl. No.: 09/877,729

(22) Filed: Jun. 8, 2001

(65) Prior Publication Data

US 2002/0080165 A1    Jun. 27, 2002

Related U.S. Application Data

(60) Provisional application No. 60/210,300, filed on Jun. 8, 2000.

(51) Int. Cl.
  *G06F 3/00*    (2006.01)
  *G06F 9/00*    (2006.01)
  *G06F 17/00*   (2006.01)

(52) U.S. Cl. .............. 715/716; 715/733; 715/722; 715/719

(58) Field of Classification Search .............. 345/723, 345/726, 853; 370/401; 379/90.01, 93.07, 379/93.12, 93.14, 93.17; 704/240, 275; 705/26, 705/37; 707/3, 4, 5, 10, 104.1; 709/206, 709/218; 715/513
  See application file for complete search history.

(56) References Cited

U.S. PATENT DOCUMENTS

| | | | |
|---|---|---|---|
| 5,539,871 A | | 7/1996 | Gibson |
| 5,590,262 A | * | 12/1996 | Isadore-Barreca ....... 715/500.1 |
| 5,708,845 A | | 1/1998 | Wistendahl et al. |
| 5,774,859 A | * | 6/1998 | Houser et al. .............. 704/275 |
| 5,838,682 A | * | 11/1998 | Dekelbaum et al. ........ 370/401 |
| 5,884,309 A | * | 3/1999 | Vanechanos, Jr. ............ 707/10 |
| 5,893,091 A | * | 4/1999 | Hunt et al. ..................... 707/3 |
| 5,905,975 A | * | 5/1999 | Ausubel ....................... 705/37 |
| 5,918,012 A | | 6/1999 | Astiz et al. |
| 5,970,504 A | | 10/1999 | Abe et al. |
| 6,021,398 A | * | 2/2000 | Ausubel ....................... 705/37 |
| 6,029,135 A | * | 2/2000 | Krasle ......................... 704/275 |
| 6,075,526 A | * | 6/2000 | Rothmuller ................. 715/721 |
| 6,122,647 A | * | 9/2000 | Horowitz et al. ........... 715/513 |
| 6,570,587 B1 | * | 5/2003 | Efrat et al. ................. 345/723 |
| 6,573,908 B1 | * | 6/2003 | Jang .......................... 715/723 |
| 2002/0069405 A1 | * | 6/2002 | Chapin et al. ................ 725/32 |

* cited by examiner

*Primary Examiner*—Kristine Kincaid
*Assistant Examiner*—Boris Pesin
(74) *Attorney, Agent, or Firm*—Franz Antonio Wakefied, Pro, Se.

(57) ABSTRACT

A method, apparatus and system for creating, using and modifying multifunctional website hot spots including software that identifies, programs and activates hot spots with a plurality of functions wherein the functions include a shopping mode for selecting and purchasing items on a website or in a video, a digital call mode for facilitating videoconferencing and telephone calls over a globally accessible network, a digital storage area for selecting, retrieving and playing selected digital media files, a bid mode that facilitates audio and video communication during multi-task communication interface for conducting an auction and/or accepting bids, an interact mode for communicating a user with a live streamed digital media file, a link mode for directly linking to pre-identified URL addresses and an entertain mode for retrieving and activating digital media files, wherein the functions are selected based on user inputs or predetermined parameters and are activated by clicking a predetermined hot spot.

18 Claims, 9 Drawing Sheets

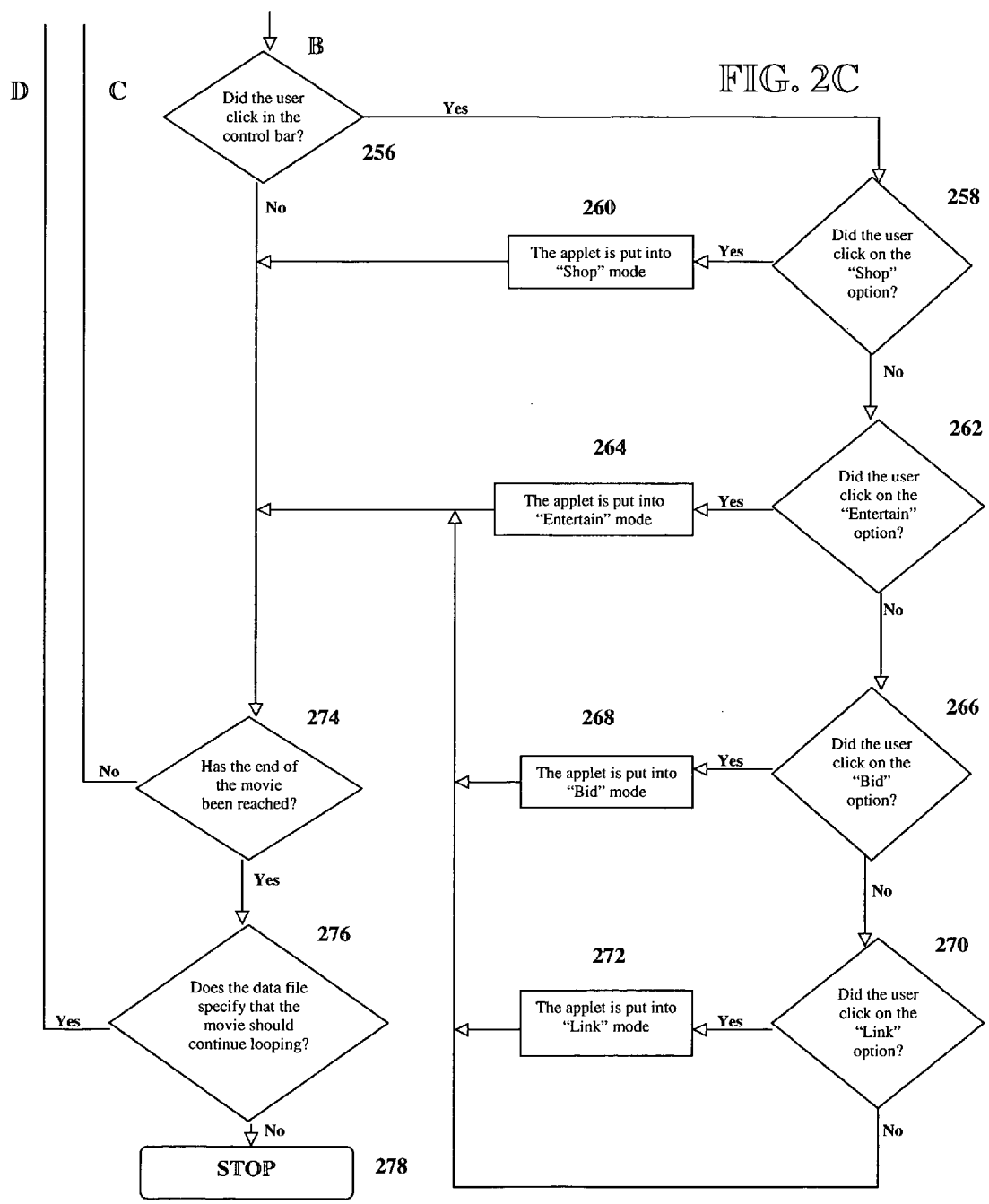

CLICKVIDEOSHOP ™

METHOD AND SYSTEM FOR CREATING, USING AND MODIFYING MULTIFUNCTIONAL WEBSITE HOT SPOTS

CROSS REFERENCE TO RELATED APPLICATIONS

This application claims the benefit of provisional application Ser. No. 60/210,300 filed Jun. 8, 2000.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to multifunctional website hot spots, i.e. hyperlinks, and more particularly, to a program or software based tool for creating, using, modifying and/or modifying multifunctional hot spots in web applications that run over a globally accessible network and a function expanding menu bar.

2. Description of the Background Art

Interactive digital media and the use of hyper-linking tools to visit a designated location or perform a pre-defined function, such as hot spots, are generally known in the art. For instance, hyper-linking tools have been developed for making text and graphics available for interactive use, such as linking to pages within a website or to other websites, making purchases or initiating other actions. A link is typically made using text, icons, images or other objects appearing in a display to access another text file, program or media function. NBCi (a trademark of NBC Internet, Inc.) provides a website at "quickclick.com" that assigns a hyperlink to certain words for accessing other webpages and/or websites when those words are clicked. Based on current technology, hot spots and hyper links are limited to preordained functions and are internally static, such that they have not been programmed or modified to perform a wide variety of functions. In addition, hot spots have not been widely adapted or incorporated into video files. As the applications employed on the Internet fail to adequately address the foregoing issues, the instant invention gives the end user the ability to effectively and efficiently control and change the response of multifunctional hot spots and hyperlinks on a website. Consequently, this invention would be well received, especially in connection with video.

As noted, the use of hyperlinks and hotspots are known in the art, however current applications are static and do not address the problems noted above. For instance, U.S. Pat. No. 5,918,012 discloses the hyperlinking of time-based data files and embedding movies into other file types. It does not disclose the use of hot spots, as contemplated by the instant invention, and does not load the data file at startup but rather consults it on every click. U.S. Pat. No. 5,708,845 discloses a system for mapping hot spots in media content for interactive digital media program. This patent discloses data files being separate from the video and linking to additional types of data. However, it fails to disclose the ability to change the type of information each hot spot links to, or having a hot spot that links to multiple databases or sites. U.S. Pat. No. 5,539,871 discloses a method and system for accessing associated data sets in a multimedia environment in a data processing system and associating data with elements in a multimedia presentation. The user may elect to have the associated data set presented by selecting the additional graphic element associated with the animated element. U.S. Pat. No. 5,970,504 discloses a moving image anchoring and hypermedia apparatus which estimates the movement of an anchor based on the movement of the object with which the anchor is associated and time intervals in which the hyperlink is active.

The foregoing prior art fails to disclose hyperlink and hot spot technology that is flexible, adaptable for use in digital media files, such as audio and video, platform independent, multi-tasked, and changeable and adaptable in functionality. The prior art also fails to disclose a menu bar that communicates with hot spots for creating, using and modifying website hot spots. Hyperlink and hot spot technology having these specifications would be well received. Consequently, there exist a need for programmable hyperlinks, multifunctional hot spots and a corresponding interactive menu bar.

SUMMARY OF THE INVENTION

The instant invention comprises an apparatus, system and method for creating multifunctional hotspots preferably for use in conjunction with digital media files, such as prerecorded and live-streamed audio and/or video, or other website content. The instant invention comprises software for expanding interaction between users and websites via a globally accessible network, such as the Internet or locally accessible networks. The software is preferably written in the JAVA programming language or other applications-based development software which is operational on a wide variety of computing platforms. The instant invention may further comprise source code that is convertible to executables as is known in the art. The software of the instant invention preferably facilitates the use of a digital media file, such as a digital video source or video stream, as a conduit for accessing related or targeted information through multifunctional hotspots imbedded or residing therein. The multifunctional hotspots may access information within the user's system, or a globally accessible network or over any local area network. Prerecorded and/or live streamed video is preferred as it provides a unique foundation for affording the user the opportunity to interact with video and other content in the website through activating with multifunctional hotspots having a plurality of different modes or functions. The multifunctional hot spots preferably comprise hyperlinks to other URL addresses and/or targeted databases. The multifunctional hot spots are preferably delineated by outlines or illumination, as visual cues to alert the user that clicking within the "multifunctional hot spot area will" give them access to additional information, files or locations. This is analogous to a hypertext link being highlighted in an HTML format when the cursor moves over it.

The software further comprises a function expandable menu bar for identifying, offering and delivering the plurality of activity modes of the instant invention. The function expandable menu bar comprises a plurality of different activity modes or options which is preferably displayed at the bottom area of the video being played. The location of the function expandable menu bar may vary. The function expandable menu bar comprises a plurality of different modes/functions including a shop mode ("clickvideoshop™" a trademark of applicant), a digital call mode ("cooldigicall™" a trademark of applicant), a digital storage and retrieval mode ("digitallocker™" a trademark of applicant), a bid mode, an interact mode ("cool-interaction™" a trademark of applicant), a link mode, and an entertainment mode. A multifunctional hot spot can support one or more modes at any time. The shopping mode allows a user to fill a shopping cart with digital media files, the object or merchandise that was highlighted by the hot spot and other items for purchase. The digital call mode provides video conferencing and/or internet originated and operated telephone calls ("cooldigicalls™" a trademark of applicant) between two or more software users. The digitallocker mode provides a storage area for saving and playing digital media files selected therefrom. The bid mode facilitates audio and/or video communication between multiple users/clients in a multicast communication interface for conducting an auction and/or receiving bids for obtaining products or product information. The interact mode facilitates interaction between users and live-streamed Internet programs. The link mode hyperlinks to related or targeted web pages and/or web sites in an auxiliary browser. The entertain mode accesses related or targeted web sites, information and/or digital media files. Clicking an option in the menu bar determines the action to be taken when a user clicks on a multifunctional hot spot.

Hot spots support at least one of the modes provided by the function expandable menu bar and can support all modes if desired. The software of the instant invention provides for a virtually unlimited number of associations between digital media files, such as video and Internet accessible information. The menu bar is configured to expand for the support of additional relationships, actions and links. For example, during playback of a music video, a hot spot could load and make available in-depth product or performer information (Celebrity VideoTimeCapsules™) and (Celebrity VideoBiographies™ or Now-&-Then Entertainment News (a trademark of applicant) related to something in the video, a bid submission form, or an additional media file. The function of hot spots may vary during the running of a digital media file based on time stamps or other parameters. The action of the hot spots could be determined by a length of time into a video, or beginning and ending time stamps within the video or software correlating to the video. A multifunctional hot spot is activated when a user moves the cursor into the designated area at a point in time within the time-stamped interval in which the hot spot is specified to be active for a certain activity. An active hot spot is one in which the perimeter of its area is visible, or the area has been illuminated. A multifunctional hot spot comprises a designated area within a digital media file, such as a video stream or wave file for accessing information or data residing on a particular website or database. The hot spots may further include the beginning and ending time stamps specified in a data file, which may be loaded when a video is loaded and contain as many hot spot definitions as necessary. When a video reaches the end, a data file may specify whether or not the video should start at the beginning or some other designated location.

In accordance with the foregoing, it is an object of the instant invention to provide a software based apparatus, system and/or method for multifunctional hotspots that may be created or modified in accordance with predetermined parameters or user inputs.

It is also an object of the instant invention to provide an apparatus, system and method for creating and/or modifying multifunctional hotspots with a plurality of applications that may be activated or rendered idle based on predetermined parameters or user inputs.

It is a further object of the instant invention to provide an expandable menu bar having a plurality of hot spot defining options and an interface for receiving user inputs for defining the next action of the hot spot based on the user input.

In accordance with these and other objects, which will become apparent hereinafter, the instant invention will now be described with particular reference to the accompanying drawings.

BRIEF DESCRIPTION OF THE DRAWINGS

FIGS. 2A–2C are a software flow diagram illustrating another embodiment of the operation, features and use of and user interaction with the instant invention.

DETAILED DESCRIPTION OF THE INVENTION

Figure 1A:
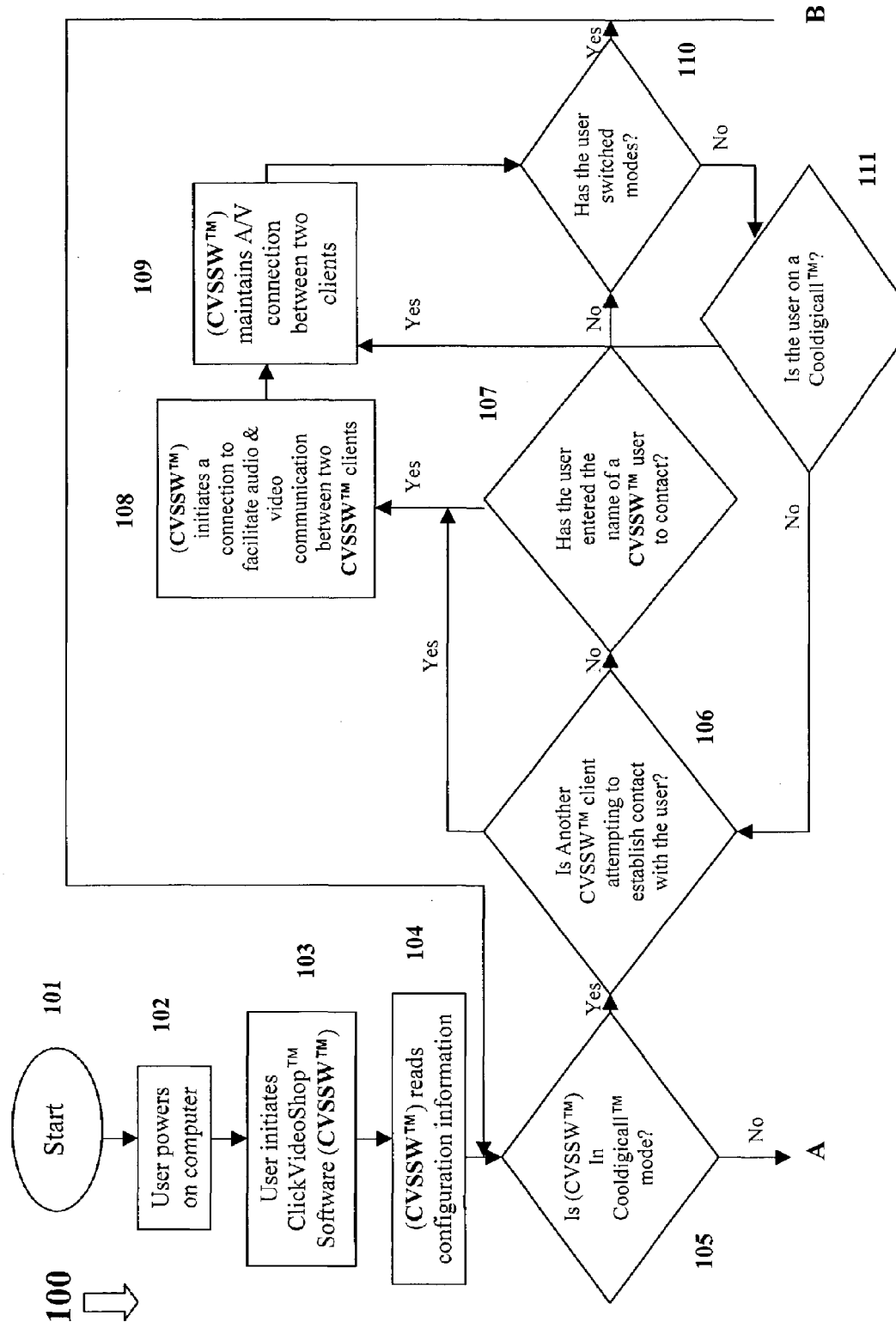
FIGS. 1A–1C are a software flow diagram illustrating the operation, features and use of and user interaction with the instant invention in accordance with the preferred embodiment.

With reference to the drawings, FIGS. 1A–C to 5 disclose the preferred embodiments of the instant invention which is generally referenced by numeric character 10 and/or as ClickVideoShop™ (a trademark of Applicant) system and/or software ("CVSSW", a trademark of Applicant). The instant invention 10 comprises an interactive software based system and device having processor readable code 100 and/or 200, as shown in FIGS. 1A–1C and 2A–2C, respectively, stored on a tangible medium that can add, use, change, adapt and process hot spots, such as hyperlinks and other known actions, in video files, audio files, digital files and/or designated areas of a website or webpage, so as to provide multifunctional hot spots. The instant invention 10 adds multifunctional hot spots to video and/or audio files or other types of digital files and provides a means for using and modifying the functions of the hot spots. Thus, the hot spots may be programmed with multiple objects and/or functions that may be activated or deactivated through a menu bar 93 having a plurality of modes and means for activating same, such as control buttons 94 that define the hot spot(s) with a predetermined function in response to successful user interaction with the buttons 94 in accordance with the invention. The software of the invention 100, 200, hot spots and corresponding objects or applications are platform independent and may be defined in one or more databases. The hot spots may be programmed with hyperlinks, JAVA applications and/or other types of applications based code for performing various functions while a user is residing in a video file, audio file or other location within a webpage or website, such as making a bid in a bidding or auction system mode 91, linking to another web page or URL address in a link mode, linking to other videos or audio files in an entertainment mode, placing a digital telephone call in a digital call mode, or transmitting or accessing other types of communications, systems (e-mail, etc.) and information, as shown in FIGS. 1A–3. The invention 10 embeds, links or makes available multifunctional hot spots that change modes automatically based on predetermined parameters or user interaction with the menu bar 93 in the video file, audio file or other type of digital file or location with the corresponding website or webpage.

The hot spot functions comprise a plurality of actions that are accessible on the function expandable menu bar. The function expandable menu bar comprises the plurality of different functions or modes. The clickvideoshop™ mode is configured to perform various actions when activated. The shop mode allows a user to click a hot spot and add items to a shopping cart. The cooldigicall™ mode facilitates video conferencing and digital phone calls over a globally accessible network between two or more clickvideoshop™ software users. The digitallocker™ mode comprises a device and means for storing and retrieving audio media, video media or other designated data or files. The digitallocker™ modem mode may further facilitate the separation of audio and visual tracks as well as the storage of individual tracks independently. The bid mode facilitates audio and video communication between multiple clickvideoshop™ software users by initiating a clickvideobay™ (a trademark of Applicant) and clickvideohub™ (a trademark of applicant). The bid mode may provide a multi-cast communication interface by providing a shared white board, chat rooms, instant messaging, auctions for exchanging product and production information that is disseminated via video or text, e-mail notification of selected highlights and a view of the user's digitallocker™, with the ability to add audio and video from the multi-cast session. The interact mode facilitates interaction between the user and live-streamed internet programs. The user is able to communicate and/or interact with network designated queues by clicking on hot spots in a live audio and/or video streamed file being broadcasted over the internet. In the interactive mode, the user can also interact or communicate by using multi-task communication windows and the teleconference functions of the software, such as that provided by the digital call mode. In these modes, the user can activate a voice recognition function to activate certain software functions and initiate the multifunctional hot spots in the live streamed audio and/or video file. In the link mode, hot spots in the main audio and video file are initiated and open web pages, websites or other URL addresses in an adjacent browser or window or in a main playback browser/window. In the entertainment mode, the activation of hot spots causes the opening of related or targeted audio and video and/or video files related to the designated hot spot and an auxiliary browser/window. Examples of related video files may comprise Video Biographies™, Entertainment News™, Video Time Capsules™ and other entertaining audio and video files (VideoBiographies™, Now-And-Then Entertainment News™, and Celebrity VideoTimeCapsules™ are trademarks of Applicant).

The invention 10 may incorporate HTML language or a comparable language for loading documents through a web browser. The HTML document loaded by the web browser may contain a downloadable custom plug-in(s) that implements an algorithm, and/or tags that specify, among other things, the path to a Java applet containing the object, source, executable or application code necessary to execute the multifunctional hot spots and currently active function as defined by a predetermined parameter or user input; the path to the video or audio file that the applet will play; and/or the path to a data file that contains variables used to create objects and/or applications having the information needed to identify, define and activate the multifunctional hot spots and their location in designated areas on the screen or in the corresponding digital file. A data file contains tags that can specify various functions when a hot spot is activated, such as, whether the video file should only play once or play in a continuous loop; the URL of the web page or website to open when a hot spot is activated; an electronic signature that uniquely identifies a user and item(s) for adding to a shopping cart; the URL of a video file or audio file to play when a hot spot is activated; an electronic signature that uniquely identifies a purchased or auctioned item such that a request or bid for it can be entered into a multicast bidding or purchasing system; and/or an electronic signature that uniquely identifies an item or area on the screen that once initiated a communication system/digital calling system is activated in accordance with the digital call mode 95.

The instant invention requires, but is not limited to, at least one tag in the data file, and at least one of the above noted steps should be specified for defining the "hot spot's" functionality, as defined through the mode control bar 93. In accordance with the teachings of the instant invention, a "hot spot" can be programmed with more than one definition or functionality, and the mode control bar can be expanded to an indefinite number of mode control features and buttons.

Figure 1B:
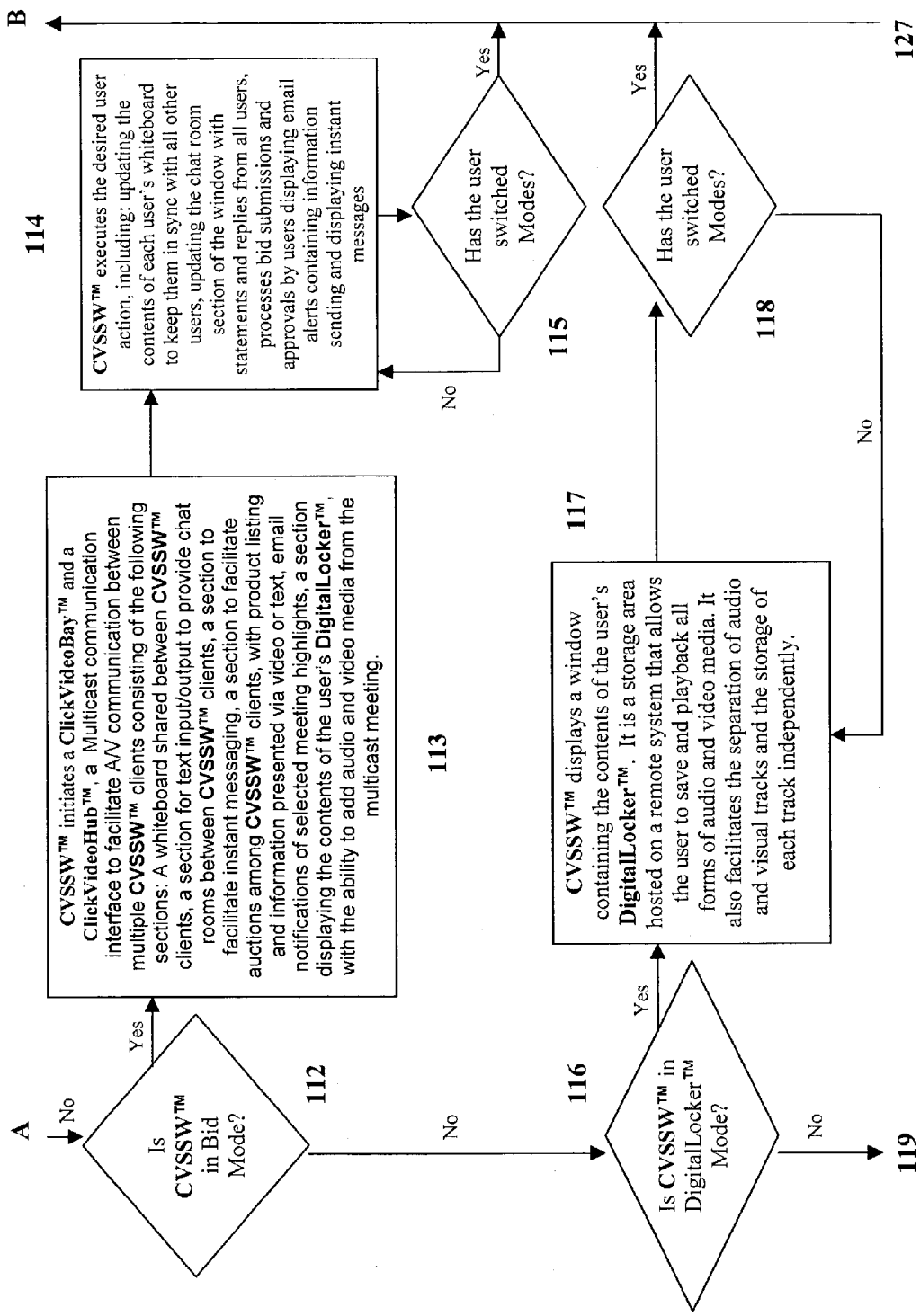
Figure 1B:
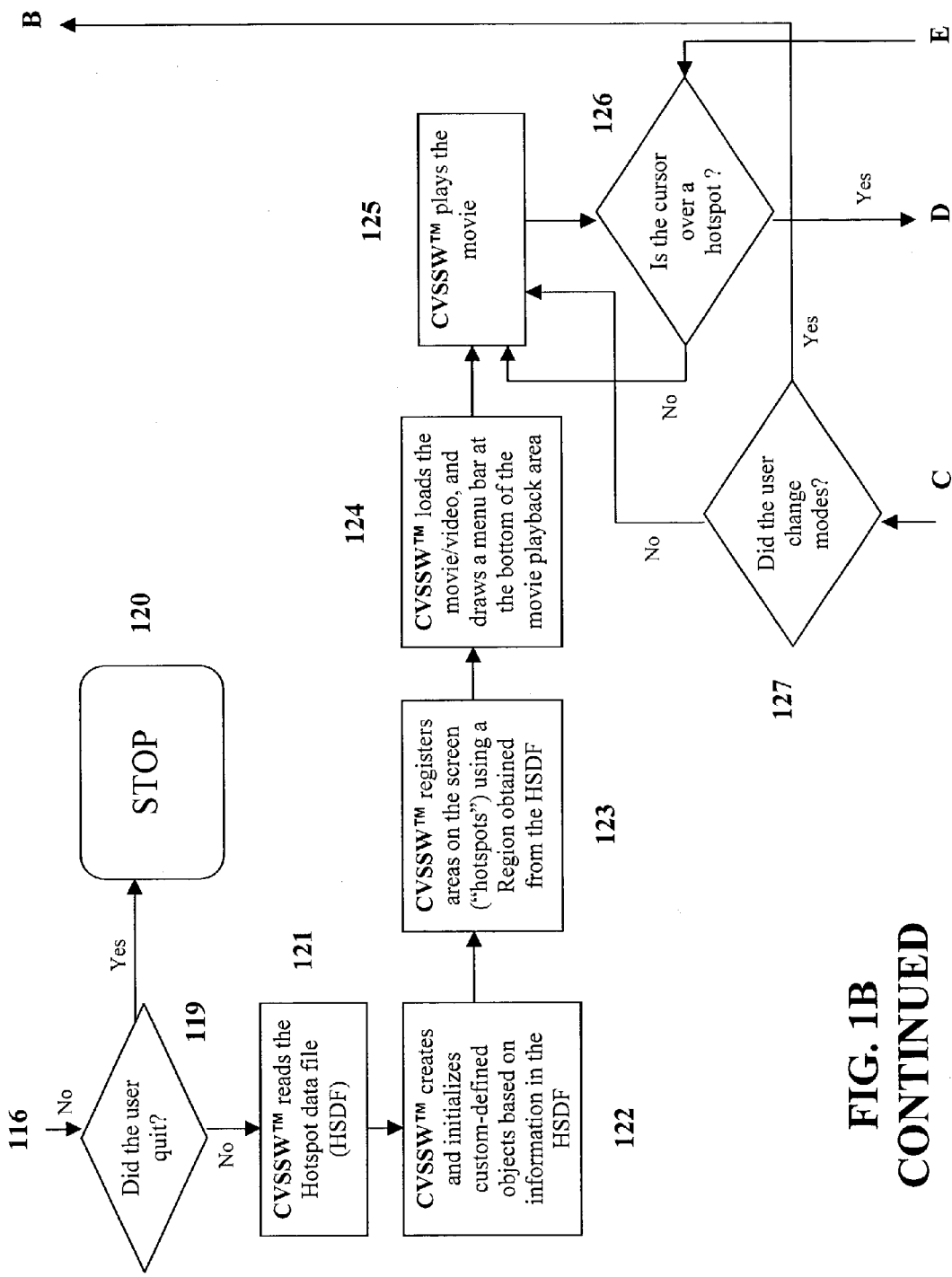
Figure 1C:
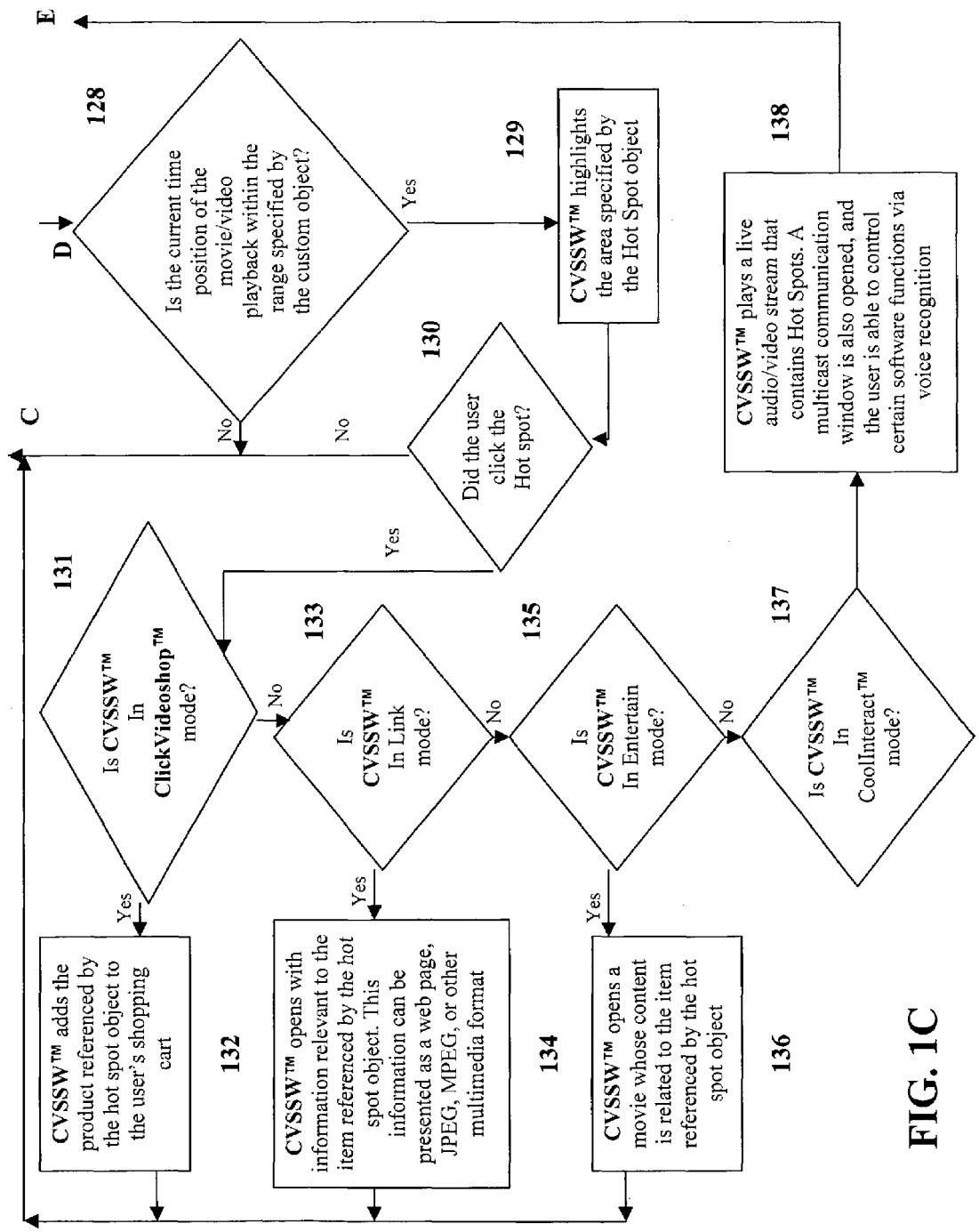

Referring to FIGS. 1A–1C, the logic and operation of the preferred software 100 of the instant invention 10 is shown. With reference to FIG. 1A, the user powers up the computer and initiates the click video shop™ software 100, which reads the configuration information for the hot spots (101–104). The software 100 then determines what mode it is in for determining what action to take when a hot spot is activated. If the software 100 is in the digital call mode, then the software 100 determines whether another client is attempting to establish a contact with another user (105–106). If not, then the software 100 determines whether the user has entered a name of a user contact for initiating and placing a call (107). In either event, once a target user has been identified, the software 100 initiates a connection between the users/clients to facilitate audio and video communication between the clients (108). The software 100 maintains an A/V connection between the two clients throughout the call (109). Throughout the call, the software 100 monitors the activity to determine whether the primary client user has switched modes (110). If yes, then the software 100 moves back to determine what new mode has been activated. If a new mode has not been selected, then the software 100 continues to monitor whether the user is on the digital call and maintains the A/V connection between the two clients throughout the duration of the call (111).

With reference to FIG. 1B, the software 100 determines whether the user has selected the bid mode (112). If yes, then the software 100 initiates a ClickVideoBay™ in a ClickVideoHub™, which is a multicast communication interface to facilitate A/V communication between multiple clients (113). The multicast communication interface comprises a white board shared between software clients, a section for text input and output to provide chat rooms between software clients, a section to facilitate instant messaging, a section to facilitate auctions among software clients, with product listing information presented via video or text, e-mail notifications of selected meeting highlights, a section displaying the contents of a user's digital locker and the ability to add audio and video media from the multicast meeting (113). Thereafter, the software 100 executes the desired user action, including updating the contents of each user's white board to keep them in sync with all other users, updating the chat room section of the window with statements and replies for all users, processing bid submissions and approvals by users, displaying e-mail alerts containing information, and sending and displaying instant messages (114). Throughout, the software 100 monitors whether the user has switched modes (115). If no, the software continues to execute the desired user actions. If yes, then the software 100 moves back to the mode identification routine.

The software 100 also determines whether the user has selected and activated the digital locker™ mode (116). If yes, then the software 100 initiates and displays a window containing the contents of the user's digital locker™ (117). The digital locker™ is a storage area hosted on a remote system or database that allows the user to save, retrieve and play back all digital forms of audio and video media. It also facilitates the separation of audio and visual tracks in the storage of each track independently. Throughout the digital locker™ mode, the software 100 monitors whether the user has switched modes (118).

If no mode is determined as being selected, the software 100 determines whether the user has exited the program (119). If not, the software 100 reads the multi-functional hot spot data file (HSDF) and creates and initializes custom defined objects based on information in the HSDF (121–122). The software 100 registers areas on the screen or in the video as multi-functional hot spots using a region obtained from the HSDF (123). The software 100 then loads the movie/video/audio file and activates and/or draws the menu bar 93 at the bottom of the video playback area or some other designated location (124). The software 100 then plays the movie/video/audio file (125). The hot spot is continuously monitored to determine whether the user has placed the cursor over a hot spot (126) and if not, it continues to play the file. If the user has placed the cursor over a hot spot, then the software 100 determines whether the current time position of the movie playback is within the range specified by the custom object (126–128). With reference to FIG. 1C, if the movie is within the time stamped range, then the software 100 highlights the area specified by the hot spot object (129). The program then determines whether the user has clicked the hot spot (130). If not, the program determines whether the user has changed modes or is remaining in the "play movie" mode. If the user clicks the hot spot, then the software 100 determines what mode the user has selected (130, 131, 133, 135, 137). Depending on the time stamped region and HSDF, the software 100 will activate the action corresponding to the mode and the video file time stamped range. If in the shop mode, then the software 100 will add products referenced by the hot spot to the user's shopping cart (132). If in the link mode, then software 100 opens with information relevant to the item referenced by the hot spot object and presents this information as a web page, jpeg, mpeg or other multi-media format (134). If the user has selected the entertainment mode, then the software 100 opens a movie/video/audio file whose content is related to the item referenced by the hot spot object as it correlates to the time stamped period in the video or movie (136). If the user has selected the cool interact™ mode then the software 100 plays a live audio/video stream that contains hot spots and a multicast communication window is open and the user is able to control certain software functions via voice recognition (138). The software 100 makes all modes available simultaneously for selection and continues to monitor user activity for determining what actions to take when a hot spot is activated, as shown in FIGS. 1A–1C.

Figure 2A:
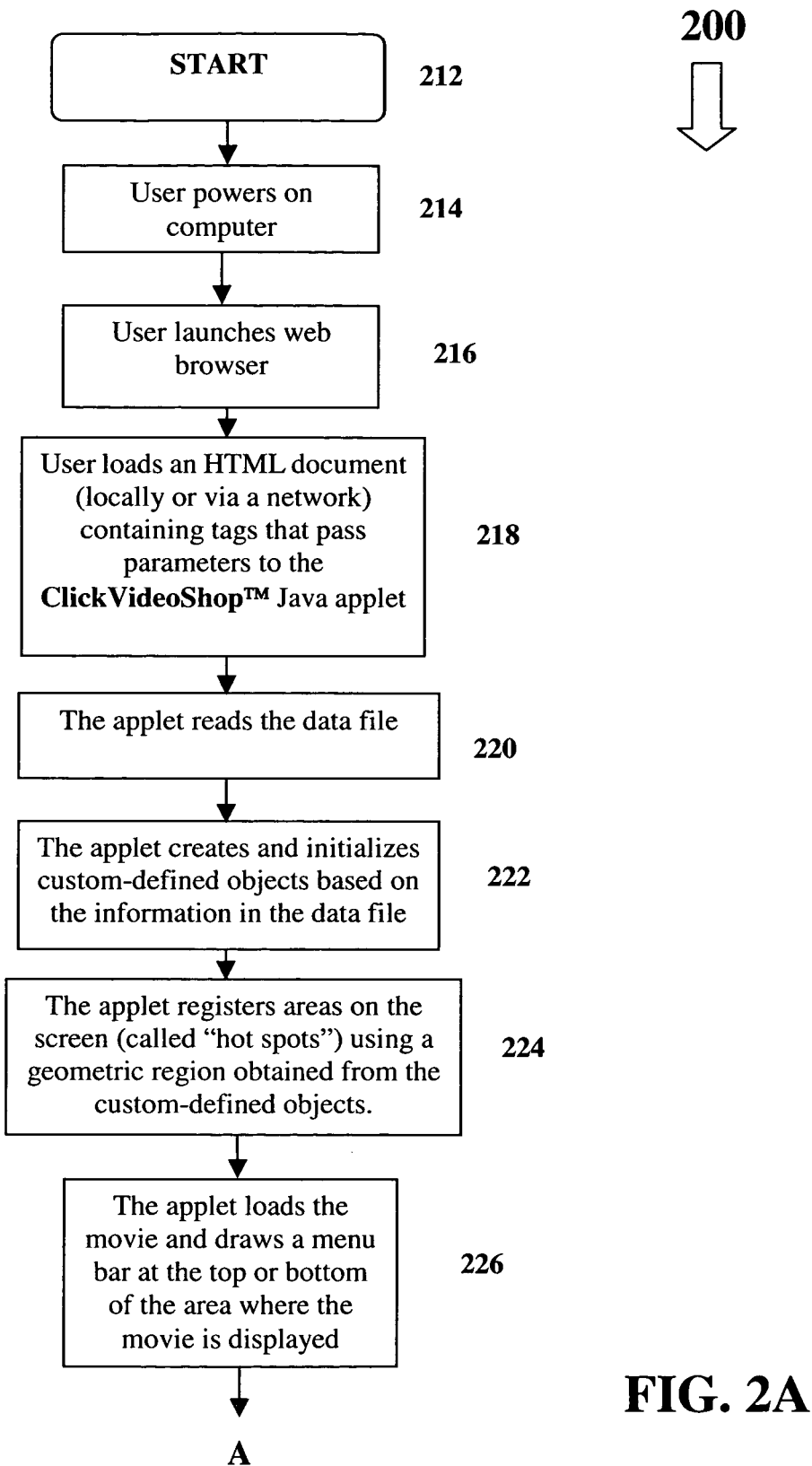
Figure 2B:
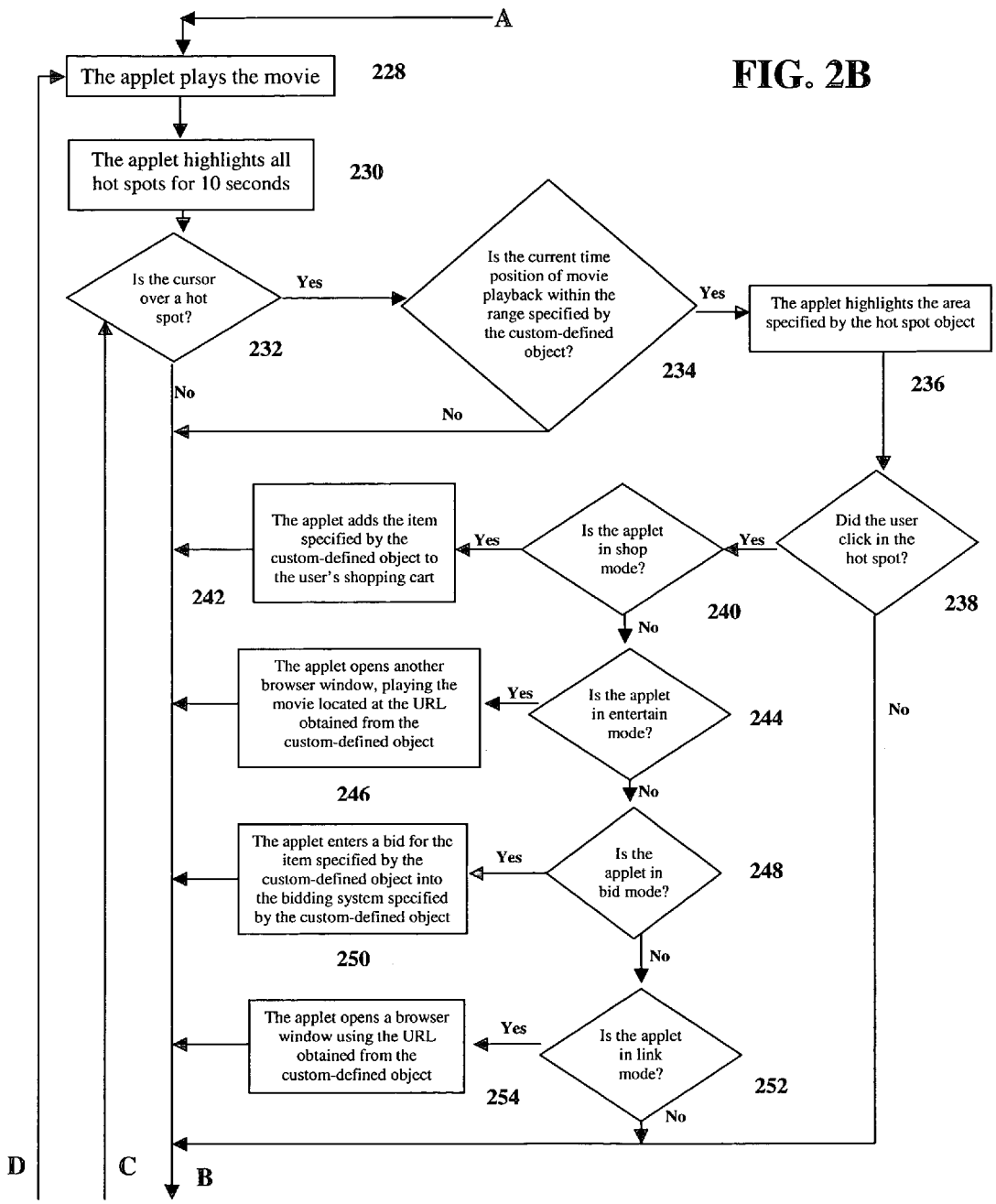

The logic and operation of an embodiment of the software 200 of the invention 10 is shown in FIGS. 2A–2C. With reference to FIG. 2A, a user powers up the computer, launches a web browser and loads an HTML document containing a downloadable custom plug-in(s) that implements an algorithm and/or tags that pass parameters to a Java applet (212–218). It is important to note that a downloadable custom plug-in(s) may be used to implement an algorithm to perform the same tasks, instead of a Java applet. Consistent therewith, the applet reads the data file, creates and initializes custom defined objects or functions in accordance with the data file and registers areas on the screen as hot spots using a geometric region obtained from the custom defined objects (220–224). The applet loads the video or audio file and draws or uploads a menu bar 93 at the top, bottom or other location in or near the video area 90 where the video or audio file is displayed and plays the file (226–228). The applet gives a visual cue, such as highlights, illumination, or shading in or around the area of the hot spot(s) for a particular time interval, such as ten (10) seconds (230), which occurs while the movie is playing, but not necessarily all at the same time. Time stamps may be placed in the video or audio file or a corresponding routine for monitoring and communicating with the video and hot spot function for activating and deactivating functions based on the progress of the video or audio file in relation to the time stamps. User inputs in the menu bar 93 may override predetermined functions and/or time stamps.

With reference to FIG. 2B, the software 200 of the invention 10 continually monitors whether the screen cursor is over a hot spot (232). If the cursor is detected as not being over a hot spot, then the invention 10 determines whether a control bar action has been activated (256). If the cursor is detected as being over a hot spot, then it checks whether the current time position of the movie playback is within the range specified by the custom defined object (234). If the answer is no, then the program 10 determines whether a control bar action has been activated (256). If the time position is within the specified range, then the applet gives a visual cue in the area specified by the hot spot object (236). Next, the program of the invention determines whether the user has "clicked" or otherwise activated the hot spot. If no, then the program goes on to determine whether a control bar action has been activated (256). If the user activates the hot spot (i.e. clicks it), then the program determines the mode of the applet (240–252), as shown in FIG. 2B. If in the shop mode, the applet adds the items specified by the custom defined object to the user's shopping cart (240–242). If the applet is in the entertain mode, then it opens another browser window, playing the video or audio file located at the URL address obtained from the custom defined object in the corresponding hot spot (244–246). If the applet is in the bid mode, then it activates the bidding routine of the software and enters bids correlating to electronic signatures as they are made into the bidding system for the item specified by the custom defined object (248–250). If the applet is in the link mode, and the hot spot is activated then it the program opens a browser window and links to the URL obtained from the custom defined object in the hot spot (252–254). After determining the applet mode or lack thereof, the program 200 determines whether the user clicked or activated the mode or control buttons/bar 93.

Regardless of how the user or program 200 gets to the decision block for determining whether the user has clicked in the control bar 93, the program 200 proceeds with said inquiry and several other inquires depending on the responses. For instance, if the program determines that the user has not clicked in the control bar (256), then it determines whether the video or audio file has reached the end (274). If not, the program 200 loops back to determine whether the cursor is over a hot spot (232). If the video or audio file is determined to have reached the end, then the program 200 checks the data file to see if the video should go into a continuous loop (276). If yes, then the program 200 loops back and continues playing the movie (228). If no, then the program stops (278). If the program has determined that the user has in fact clicked in the control bar (256), then it ascertains what mode was selected from the control bar (258-272). After the mode or option has been determined, the program checks to see if the video or audio file has reached the end, as described above (274-276).

Figure 3:
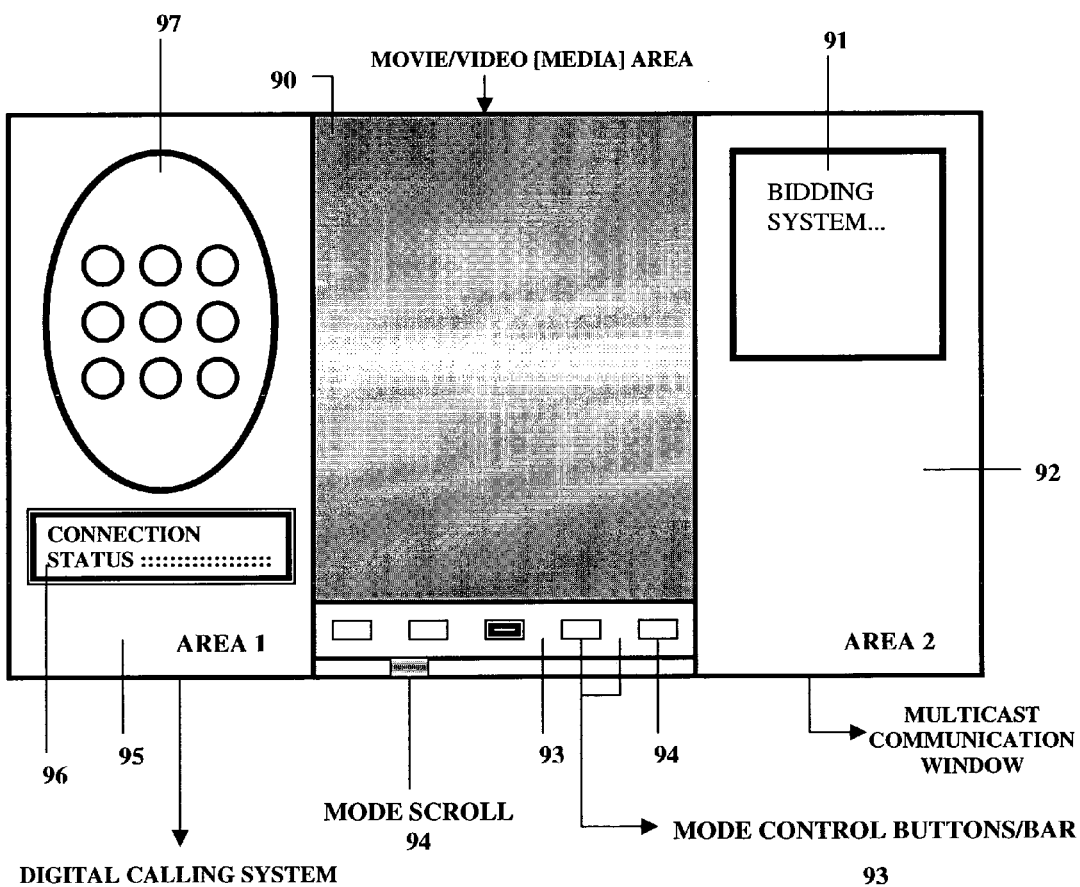
FIGS. 3–5 are illustrative views of representative and alternative screen displays in accordance with the instant invention.
Figure 4:
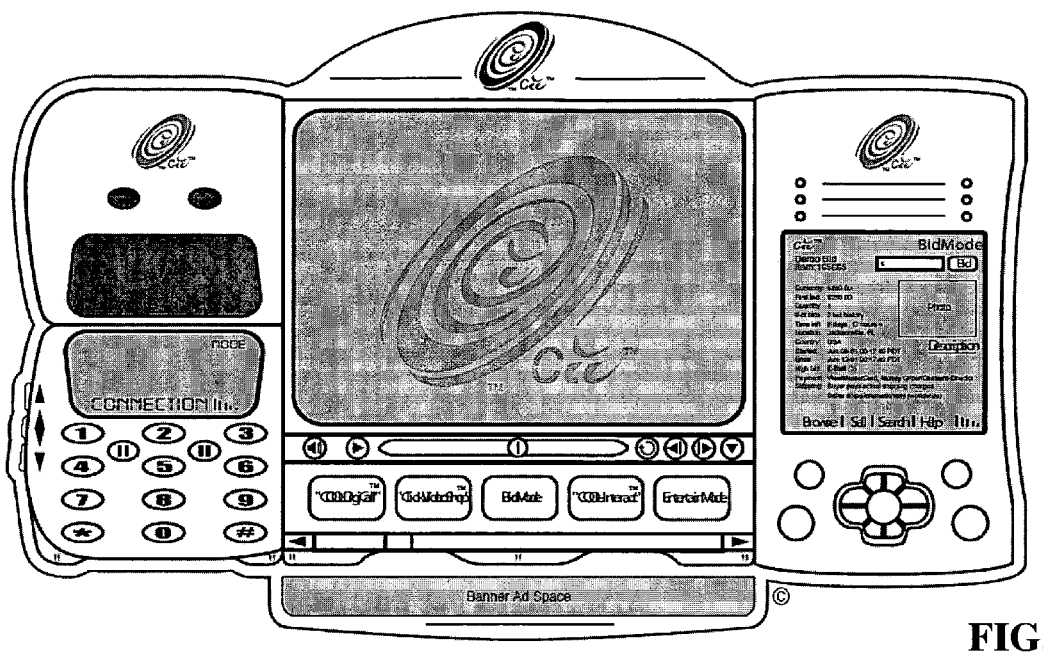
Figure 5:
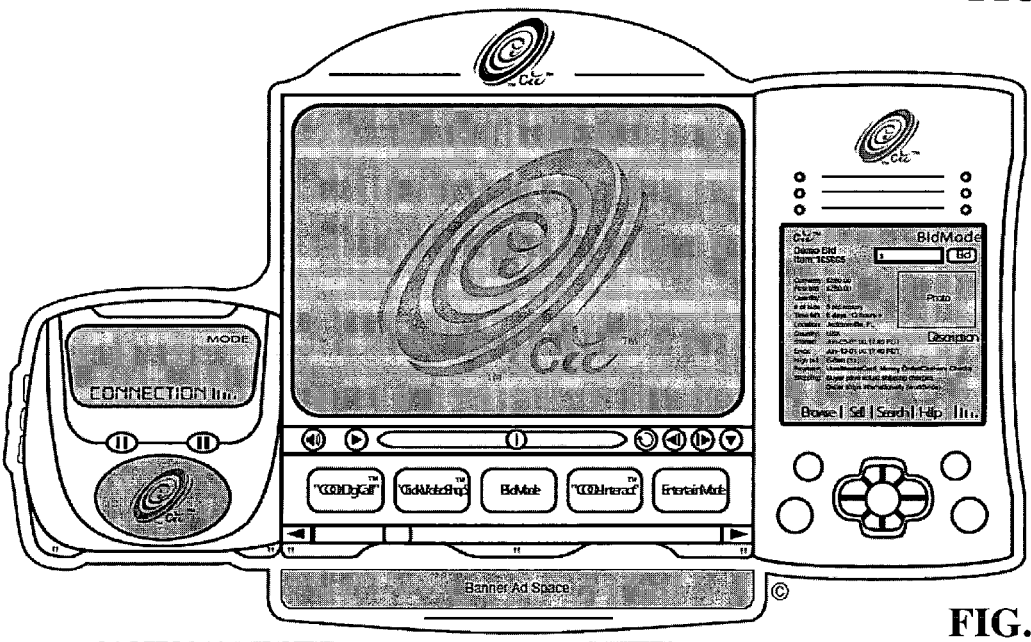

Area 1 and Area 2 of FIG. 3 are Multicast Windows that are controlled by the mode control bar. The windows only appear when the video is placed in a particular mode (i.e. bid, cooldigicall™ (a trademark of Applicant), clickvideoshop™ (a trademark of Applicant), entertain, cool-interact™ (a trademark of Applicant), digitallocker™ (a trademark of Applicant), coolecall™ (a trademark of Applicant), play, or link . . . etc,). FIGS. 3–5 are illustrative views of representative and alternative screen displays in accordance with the instant invention. The shape of the Video Area, Multicast Windows, and general layout of the Entertainment Area are subject to design change. It should be understood that the invention is not limited to the disclosed embodiment, but on the contrary is intended to cover various modifications and equivalent arrangements included within the spirit and scope of the claims. The instant invention has been shown and described herein in what is considered to be the most practical and preferred embodiment. It is recognized, however, that departures may be made there from within the scope of the invention and that obvious structural and/or functional modifications will occur to a person skilled in the art.

What is claimed is:

1. A Multifunctional Hot Spot apparatus comprising:
at least one hot spot defined by a communication with instructions stored on a tangible retaining medium;
at least one of the hot spots being accessible from a globally accessible network;
means for performing at least one of a plurality of predetermined functions executed with the selection of each particular hot spot;
wherein said hot spots reside on and are accessible from a digital video or audio file;
wherein said predetermined functions are selected from a mode control;
wherein the mode control comprises a plurality of modes;
wherein the plurality of modes comprise a shop mode, a bid mode, an interact mode, an entertainment mode, and a link mode;
wherein a specific mode is selected by a user through an expandable graphical user interface bar;
wherein said specific mode further toggles based on time stamps in said digital video or digital audio file;
wherein said hot spots are visualized by outlines, shading, or illumination or a combination of each, at a predetermined area on the display;
wherein said Multifunctional Hot Spot apparatus is made to reside on and is executing on a computing system;
means, defined by said instructions, for selecting and activating at least one of said predetermined functions by clicking on each particular Multifunctional Hot Spot.

2. An apparatus as recited in claim 1:
where said predetermined functions comprising:
means for further identifying items available on a website for purchase.

3. An apparatus as recited in claim 1:
where said predetermined functions comprising:
means for conducting an auction and receiving bids for the purchase of identified items, through a multicast communication window & interface.

4. An apparatus as recited in claim 1:
where said predetermined functions comprising:
means for linking to at least one predetermined URL address when said hot spot is activated.

5. An apparatus as recited in claim 1:
further comprising a means for storing and retrieving digital media, said digital media having at least one said Multifunctional Hot Spot defined therein.

6. An apparatus as recited in claim 1:
wherein said predetermined functions comprises:
means for calling a predetermined phone number or user when said hot spot is activated.

7. An apparatus as recited in claim 1:
further comprising a storage, retrieval, and modification-area apparatus:
means for providing sessions for storing, modifying, accessing and activating digital media when said Multifunctional Hot Spot is activated:
a set of processed or readable instructions storable on a retaining medium, providing a means for separating digital video and digital audio files in and from digital media and means defined to facilitate the separation of digital video and digital audio with at least one Multifunctional Hot Spot.

8. An apparatus as recited in claim 1, wherein said predetermined functions comprises:
a means for communicating a website or network user with
a digital media file having at least one said Multifunctional Hot Spot.

9. An apparatus as recited in claim 1, wherein said predetermined functions comprise:
a voice recognition means for activating at least one of said predetermined functions based on the sound of the user's voice.

10. An apparatus as recited in claim 1, wherein
said hot spots reside on and are accessible from at least one linked digital video file, wherein a linked digital video is accessible from digital video with at least one Multifunctional Hot Spot;
where said digital video is activated from a preset parameter, or upon reaching a particular segment in a digital media file;
wherein said digital video is based on a user's preference;
means defined for automatically launching digital video to the current user or launching to another active network user.

11. An apparatus as identified in claim 1:
wherein said hot spot resides in and is accessible from at least one, linked audio digital file, wherein linked digital audio is accessible from digital audio with at least one Multifunctional Hot Spot;
where said digital audio is activated from a preset parameter, or upon reaching a particular segment in a digital media file;

wherein said digital audio is based on a user's preference;
means defined for automatically launching digital audio to the current user or launching to another active network user.

12. An apparatus as recited in claim 1:
wherein said predetermined functions comprise:
at least one globally accessible address that is accessible through a globally accessible network when said corresponding identifier is selected.

13. An apparatus as recited in claim 1, where said means for selecting and activating comprises:
at least one predetermined parameter that activates a corresponding function from said plurality of functions when said parameter is satisfied.

14. An apparatus as recited in claim 13:
further comprising a means for overriding said parameter when a user selects at least one of said plurality of predetermined functions.

15. A tangible computer readable storage medium having computer readable program code portions stored therein, such that, when executed in a computer causes the computer to perform the steps of:
defining at least one hot spot by a communication with instructions stored on a tangible retaining medium;
accessing at least one of the hot spots from a globally accessible network;
performing at least one of a plurality of predetermined functions executed with the selection of each particular hot spot;
wherein said hot spots reside on and are accessible from a digital video or audio file;
wherein said predetermined functions are selected from a mode control;
wherein the mode control comprises a plurality of modes;
wherein the plurality of modes comprise a shop mode, a bid mode, an interact mode, an entertainment mode, and a link mode;
wherein a specific mode is selected by a user through an expandable graphical user interface bar;
wherein said specific mode further toggles based on time stamps in said digital video or digital audio file;
wherein said hot spots are visualized by outlines, shading, or illumination or a combination of each, at a predetermined area on the display;
wherein said Multifunctional Hot Spot apparatus is made to reside on and is executing on a computing system;
selecting and activating at least one of said predetermined functions by clicking on each particular Multifunctional Hot Spot.

16. An apparatus as recited in claim 1, further comprising:
means for adding at least one additional function to a predetermined hot spot.

17. A Multifunctional Hot Spot method comprising:
defining at least one hot spot by a communication with instructions stored on a tangible retaining medium;
accessing at least one of the hot spots from a globally accessible network;
performing at least one of a plurality of predetermined functions executed with the selection of each particular hot spot;
wherein said hot spots reside on and are accessible from a digital video or audio file;
wherein said predetermined functions are selected from a mode control;
wherein the mode control comprises a plurality of modes;
wherein the plurality of modes comprise a shop mode, a bid mode, an interact mode, an entertainment mode, and a link mode;
wherein a specific mode is selected by a user through an expandable graphical user interface bar;
wherein said specific mode further toggles based on time stamps in said digital video or digital audio file;
wherein said hot spots are visualized by outlines, shading, or illumination or a combination of each, at a predetermined area on the display;
wherein said Multifunctional Hot Spot apparatus is made to reside on and is executing on a computing system;
selecting and activating at least one of said predetermined functions by clicking on each particular Multifunctional Hot Spot.

18. a tangible computer readable storage medium having computer readable program code portions stored therein, such that, when executed in a computer causes the computer to perform the steps of:
defining at least one hot spot by a communication with instructions stored on a tangible retaining medium;
accessing at least one of the hot spots from a globally accessible network;
performing at least one of a plurality of predetermined functions executed with the selection of each particular hot spot;
wherein said hot spots reside on and are accessible from a digital video or audio file;
wherein said predetermined functions are selected from a mode control;
wherein the mode control comprises a plurality of modes;
wherein the plurality of modes comprise a shop mode, a bid mode, an interact mode, an entertainment mode, and a link mode;
wherein a specific mode is selected by a user through an expandable graphical user interface bar;
wherein said specific mode further toggles based on time stamps in said digital video or digital audio file;
wherein said hot spots are visualized by outlines, shading, or illumination or a combination of each, at a predetermined area on the display;
wherein said Multifunctional Hot Spot apparatus is made to reside on and is executing on a computing system;
selecting and activating at least one of said predetermined functions by clicking on each particular Multifunctional Hot Spot.

* * * * *

UNITED STATES PATENT AND TRADEMARK OFFICE
CERTIFICATE OF CORRECTION

| | | |
|---|---|---|
| PATENT NO. | : 7,162,696 B2 | Page 1 of 1 |
| APPLICATION NO. | : 09/877729 | |
| DATED | : January 9, 2007 | |
| INVENTOR(S) | : Wakefield | |

It is certified that error appears in the above-identified patent and that said Letters Patent is hereby corrected as shown below:

Title page, item (74) *Attorney, Agent, or Firm*: Should read --Franz Antonio Wakefield, Pro Se. --.

Signed and Sealed this

Twenty-seventh Day of March, 2007

JON W. DUDAS
*Director of the United States Patent and Trademark Office*